United States Patent [19]
Bedell, Jr.

[11] 3,940,102
[45] Feb. 24, 1976

[54] APPARATUS FOR REMOVING CORE DURING REFRACTORY MATERIAL FUSION CASTING

[75] Inventor: Edward L. Bedell, Jr., Louisville, Ky.

[73] Assignee: Corning Glass Works, Corning, N.Y.

[22] Filed: June 12, 1974

[21] Appl. No.: 478,828

[52] U.S. Cl. .................................. 249/63; 164/345
[51] Int. Cl.² .......................................... B29C 11/00
[58] Field of Search ........ 249/63, 64; 164/132, 345, 164/346

[56] References Cited
UNITED STATES PATENTS

| 622,746 | 4/1899 | Wolcott | 249/63 X |
|---|---|---|---|
| 1,683,475 | 9/1928 | Littel | 164/132 |
| 1,698,308 | 1/1929 | Lemcke | 249/63 X |
| 1,929,842 | 10/1933 | Forster | 249/63 X |

Primary Examiner—Francis S. Husar
Assistant Examiner—John E. Roethel
Attorney, Agent, or Firm—Barry S. Bissell; Richard N. Wardell; Clarence R. Patty, Jr.

[57] ABSTRACT

Fusion-cast articles of refractory material are formed with cavities or hollow portions by means of apparatus and method employing a core formed of material more refractory than the fusion-cast refractory material, which core is disengaged from the refractory material solidifying therearound when such solidified portion has the capability of maintaining its integrity and shape absent support of the core, but before cooling shrinkage of the solidified portion onto the core has caused cracking of such portion. A stored energy device is connected to the core through an aperture in the mold which is sealably engaged by the core, and upon release of the stored energy, the disengagement of the core is effected, e.g. by at least partial removal from the mold through the aperture.

6 Claims, 3 Drawing Figures

APPARATUS FOR REMOVING CORE DURING REFRACTORY MATERIAL FUSION CASTING

BACKGROUND OF THE INVENTION

The invention relates to the manufacture of fusion-cast refractories with cavities or hollow portions therein formed by cores disposed in molds employed in the fusion casting process. In particular, it relates to a new dynamic core apparatus and technique for improving the manufacture of such fusion-cast articles.

Exemplary general description of the manufacture of fusion-cast refractories is given in U.S. Pat. No. 1,615,750 and in the book entitled "Refractories" by F. H. Norton, 4th edition, published 1968 by McGraw-Hill Book Co., New York, on pages 186–9.

Heretofore, most efforts in forming cavities or hollow portions in fusion-cast articles have involved utilization of cores maintained in place until after the solidified casting had cooled through the annealing stage. Such stationary cores were commonly formed of various shaped and baked refractory grains. See U.S. Pat. Nos. 1,903,944, 2,023,044 and 2,071,542. These cores were supposedly designed to overcome the problem of the casting cracking as a result of the cooling shrinkage of such castings around and onto cores that were generally inflexible. Although they were successful in some cases, this cracking problem has persisted in a number of other cases for a variety of reasons (e.g. lack of core grains with appropriate characteristics vis a vis those of the cast molten refractory, size of cores and castings, etc.).

One earlier alternative solution to such continuing problem was the employment of a core made of metal that melted after an initial layer of solidified refractory formed on it and immediately allowing such melted core metal to flow out of the casting and mold via an aperture in the mold previously sealed by such core. See U.S. Pat. No. 2,004,378. Upon further cooling, the casting did not encounter resistance to its natural shrinkage and, accordingly, did not suffer the cracking associated with stationary cores of baked refractory grains or similar generally inflexible types. Nevertheless, this technique of the melting metal core suffers from the difficulty of not being able to economically or practically make the critical selection of a metal vis a vis the fusion-cast refractory such that the metal will not melt prematurely (to avoid "break-out" of molten refractory through a thin and weak solidified layer no longer supported by the core) and will melt rapidly enough at the necessary time (to avoid resistance by the core to shrinkage of the solidified casting portion therearound that leads to cracking of the casting).

SUMMARY OF THE INVENTION

It has now been discovered that the above-described problems with the prior art techniques of coring fusion-cast refractories can be overcome by a novel dynamic coring system utilizing a releasable stored energy device suitably connected to a core formed of material having a melting temperature substantially above the temperature of the molten refractory to be cast around and onto such core. This dynamic coring system is characterized by a capability of being readily adapted to a wide variety of fusion-cast refractories with differing characteristics (size, shape, composition and associated properties).

The present invention is an improvement in and incorporates the basic elements of known molding apparatus for fusion casting refractory which comprises a mold having a surface or surfaces defining a casting mold cavity and at least one core normally extending into the mold cavity from such surface or one of such surfaces and adapted to engage the refractory material solidifying therearound. The improvement therein comprises: (1) a core which is formed of material as described in the preceding paragraph, which also extends in the direction opposite from the mold cavity into an aperture in the mold, which in its normal position sealably engages the walls of the aperture, and which is adapted to be disengaged from the refractory material solidified therearound (and preferably also from the walls of the aperture accompanied by at least partial removal of the core from the mold cavity through the aperture); (2) releasable stored energy means connected to the core through the aperture and adapted to effect the disengagement of the core from the refractory material solidified therearound (and preferably also from the walls of the aperture accompanied by the aforesaid at least partial removal of the core) upon release of the stored energy; and (3) means for releasing the stored energy.

This invention also constitutes an improvement in the process of fusion casting refractory material by employing the basic elements of known molding apparatus as aforesaid. Such improvement comprises: (1) partially solidifying the cast molten material to a state where the portion solidified around the core has thickness and strength to maintain the integrity and shape thereof absent support of the core, but where cooling shrinkage of such portion has not developed to the point of exerting compressive force on the core with correlative tensile force in the noted portion which yields cracking of such portion; and (2) thereupon disengaging the core from that portion by means of releasing stored energy means connected to the core and maintaining the core so disengaged while the fusion-cast article continues to cool and completely solidify. Guided by the disclosure contained herein, an appropriate magnitude of stored energy for any suitably selected stored energy device can be readily determined from limited trials with any selected or desired combination of fusion-cast refractory and core.

DESCRIPTION OF THE PREFERRED EMBODIMENTS

Figure 1:
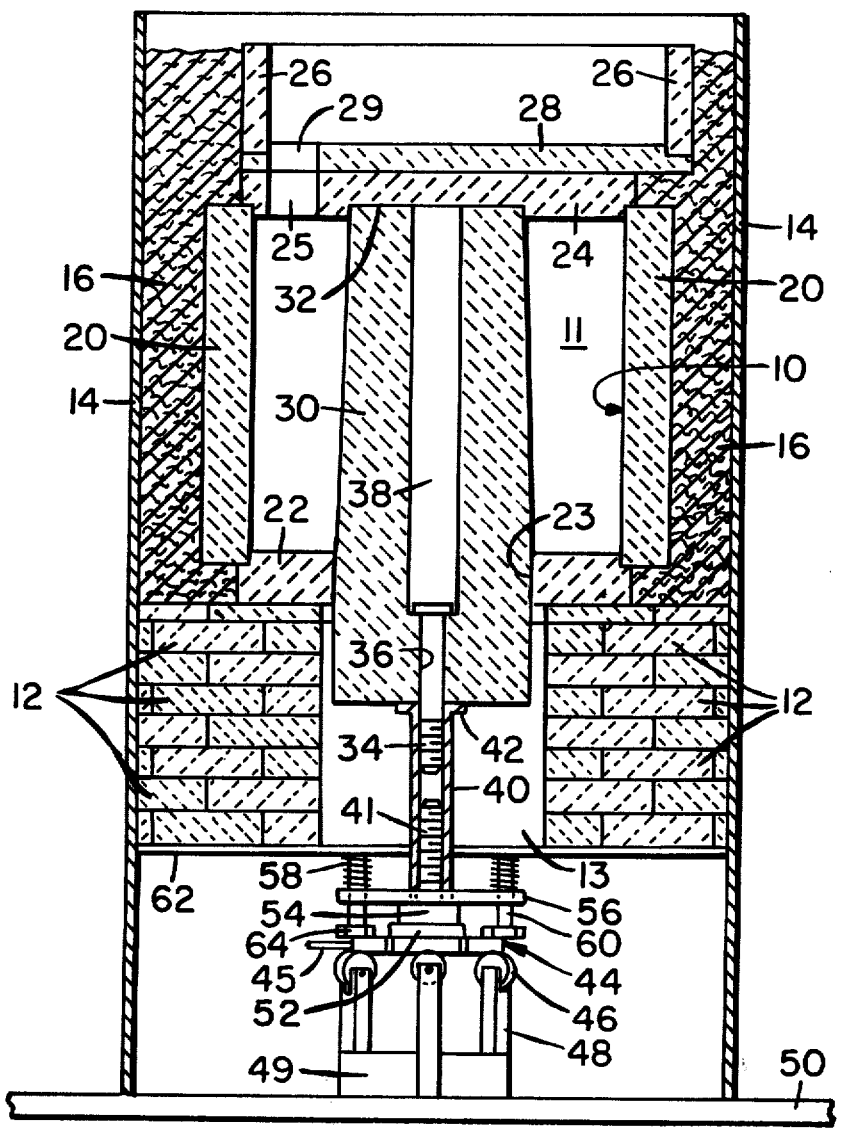
FIG. 1 is a side sectional view of one form of conventional fusion casting apparatus incorporating an embodiment of the present invention and in position ready for casting molten refractory therein.
Figure 2:
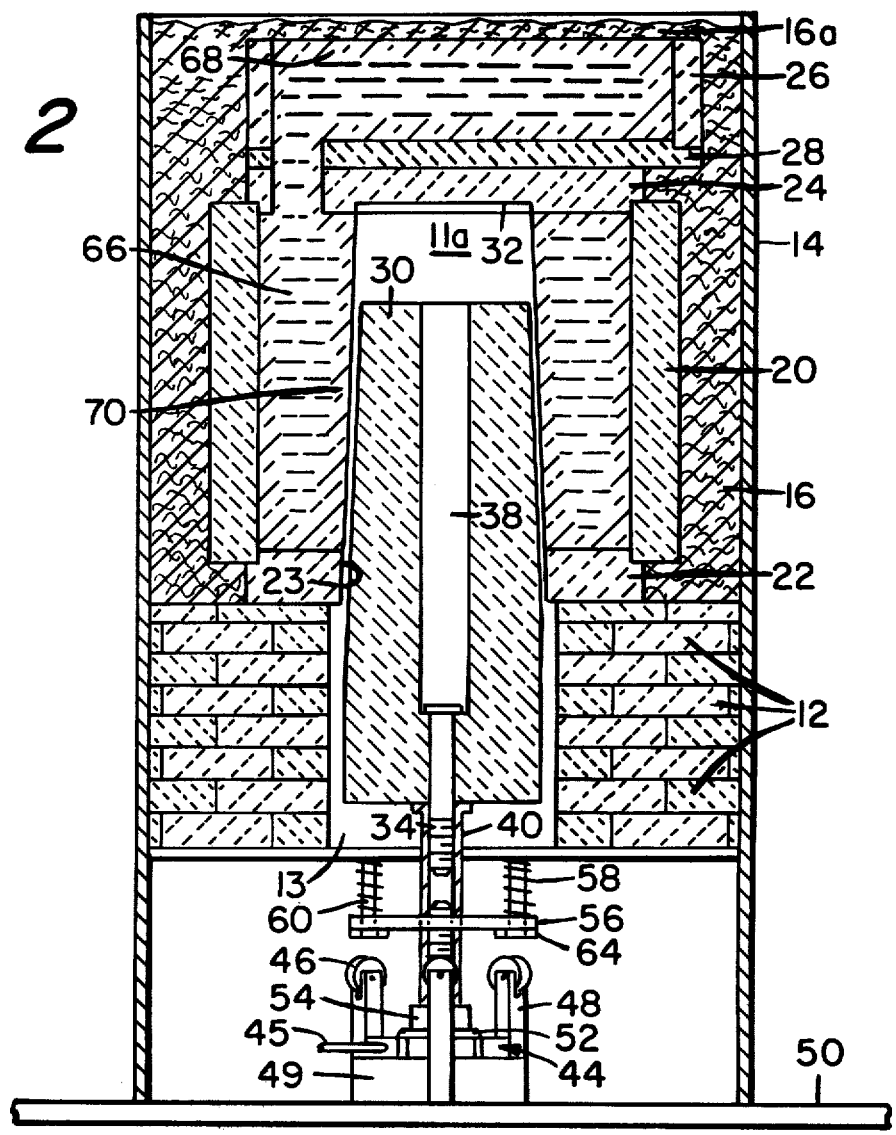
FIG. 2 is a side sectional view of the same apparatus as in FIG. 1, but with molten refractory cast and partially solidified therein and with the stored energy device in released position.

The illustrated apparatus comprises a mold 10 positioned on a base of insulating refractory bricks 12 within a can or casing 14 mounted on base 50 with insulating powder 16 filling the space between the mold 10 and can 14, all according to one conventional form of practice. The mold 10 comprises an assembly of: (a) side slabs 20, bottom slab 22 and top slab 24 forming the casting portion of the mold, and (b) side slabs 26 and bottom slab 28 forming the riser portion of the mold. The riser portion communicates with the casting portion through at least one gate defined by the axially aligned orifices 25 and 29 in the slabs 24 and 28, respectively.

According to the illustrated embodiment of the invention, bottom mold slab 22 is provided with an aperture defined by a circular wall 23 and a passage 13 axially aligned with aperture 23 is provided through the base of bricks 12. Core 30 is positioned to extend into the cavity 11 of mold 10 and sealably engage aperture wall 23. The upper end of core 30 is designed in this particular case to fit into a recess 32 in the bottom face of top slab 24 in order to define an annular mold cavity for producing fusion-cast articles, such as tap hole blocks for steelmaking furnaces and the like. Core 30 is tapered in the direction toward the top of mold 10 to facilitate subsequent disengagement of the core 30 from the solidifying refractory and from aperture wall 23. A connector bolt 34 is positioned in lower bore 36 via upper bore 38 in core 30 so as to protrude downward and threadably engage connector sleeve 40 having a flange 42 supporting the bottom of core 30.

The illustrated stored energy device comprises pressure plate 44 supported (in its stored energy position) on rollers 46 rotatably mounted on the upper ends of supports 48 attached to the base 50 of the casting apparatus. Plate 44 is rotatably connected to connector sleeve 40 by means of connector bolt 41 threadably engaging connector sleeve 40 and rigidly attached to plate 44. Annular thrust bearing 52 and spacer ring 54 are mounted around bolt 41 on top of plate 44 so that spacer ring 54 supports secondary pressure plate 56 in an elevated position placing springs 58 in compression while held in position by bolts 60 attached to brick base plate 62 and extending downward through holes in plate 56 of diameter smaller than the terminal heads 64 on bolts 60. Plate 56 also has a central opening to allow free movement of connector 40 therethrough, but is of smaller diameter than the outside diameter of ring 54.

After casting molten refractory 66 into the mold 10, additional insulating powder 16a is added to cover the solidifying portion 68 of such refractory in the top of the riser mold portion. At an appropriately predetermined time when the proper solidified layer 70 has formed around the core 30, pressure plate 44 is rotated by means of handle 45 to a position where it disengages from the rollers 46 and falls down onto base plate 49 between supports 48. This fall of plate 44 is urged by the compression of springs 58 and, in so falling down, spacer ring 54 disengages from plate 56 thereby allowing the latter to fall down and rest on bolt heads 64. Such action effectly releases the stored energy of the compressed springs 56. By virtue of the rigid connection to the core 30 via connector 40, the falling plate 44 also causes partial removal of core 30 from the mold cavity portion 11a accompanied by disengagement of the core 30 from the solidified portion 70 and the aperture wall 23. The space between the disengaged core 30 and casting portion 70 is sufficient that the latter does not shrink bindingly onto core 30 upon further cooling and solidification of the casting.

Figure 3:
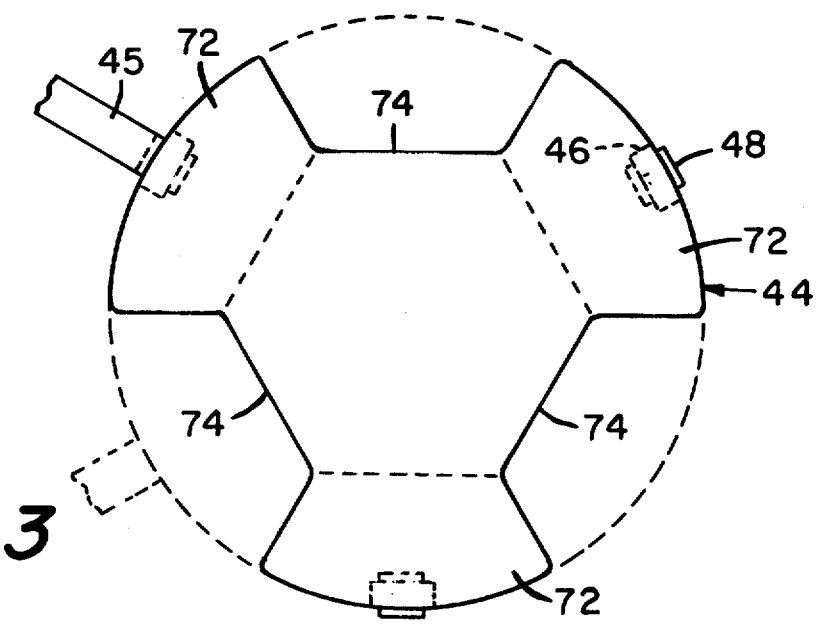
FIG. 3 is a plan view of the pressure plate of the stored energy device in two positions: shown by solid lines in mounted position on supporting rollers as in FIG. 1 and shown by dash lines in released position off and below the supporting rollers as in FIG. 2.

The illustrated stored energy release mechanism is best shown in FIG. 3. Plate 44 is shown in solid lines mounted on top of rollers 46. Plate 44 comprises three peripheral bosses 72 that rest on top of rollers 46. Between adjacent pairs of bosses 72 are indented peripheral portions 74 of substantially the same arc length as that of the bosses. Upon rotating plate 44 in its horizontal plane by means of handle 45 somewhere between 30° and 60° from its first position of bosses being centrally mounted on rollers 46, those bosses 72 will have passed off the rollers and the indented portions 74 will then coincide with the positions of rollers 46 thereby allowing plate 44 to pass down between supports 48.

By way of further illustration (but not limitation) of the invention, the illustrated apparatus was employed in producing fused-cast refractory bodies of composition in accordance with U.S. Pat. No. 3,198,643. In one case, a graphite mold and graphite core were designed to form a rectangular cast article with approximate external dimensions of 6 inches × 8 inches × 8 inches and with an approximately 5 inch diameter hollow bore therethrough. Suitable taper angle on the core 30 was varied between 0.75° to 2° from the core axis. Pull forces exerted by springs 56 on the core suitably varied from 330 to 990 pounds. Satisfactory downward displacement of the core 30 upon release of spring compression was varied between 1–3 inches. The principal operational factor determining satisfactory results under these circumstances was the hold time (i.e. the time between time of casting the molten refractory into the mold and the time of releasing compression of springs 56 with resultant disengagement of core 30). Hold time of only 45 seconds was in at least one case too little time for forming an adequately strong solidified layer around the core because "break-out" occurred through that layer of the remaining molten refractory in the casting. Although in several other trials, 45 seconds was found adequate to recover a suitable cast article, nevertheless it appears to be about the lower marginal hold time in this example. On the other hand, 120 seconds of hold time lead to cracking of the casting in at least one case, although providing satisfactory recovery in several other trials. Accordingly, 120 seconds hold time appears to be about the upper marginal hold time in this example. No "break-outs" or cracking occurred with intermediate hold times (e.g. 95 seconds).

In another case, a graphite mold and a graphite core were designed to form an octagonal cast article with approximate width between octagon faces of 29 inches, with a height of about 26.5 inches and with a hollow bore therethrough of about 15 inches diameter. A core taper of 2°, a core displacement of 8 inches and pull force of 5300 pounds were found suitable for successful results. Again, within this set of conditions, hold time variation was the principal determinant of successful results, although pull force was also seen to be a factor of some concern in getting prompt displacement of the core at the proper time. Hold times in excess of two minutes fairly consistently lead to cracking of the castings. Hold times of 2 minutes for spring release after casting consistently gave good casting recovery results (except for two cases of cracking caused by other process errors) when pull force was 5300 pounds. However, a pull force of only 4000 pounds in conjunction with a hold time of two minutes resulted in cracking of the casting, which indicated that the minimum satisfactory pull force in this case was between 4000 and 5300 pounds.

I claim:

1. In molding apparatus for fusion casting of molten refractory material which comprises a mold having a surface or surfaces defining a casting mold cavity and at least one core normally extending into the mold cavity from said surface or one of said surfaces and adapted to engage the refractory material solidifying therearound, wherein the improvement comprises, in combination the core being formed of material having a melting temperature substantially above the temperature of the molten refractory material to be cast in the apparatus, also extending in the direction opposite from the mold cavity into an aperture in the mold, normally sealably engaging the walls of the aperture and adapted to be disengaged from the refractory material solidified therearound, releasable stored energy means connected to the core through the aperture and adapted to effect the disengagement of the core from the refractory material solidified therearound upon release of the stored energy, the energy means including:

a connector having one end attached to the core, spaced supporting means including rollers, compression load means mounted on the end of the connector opposite the end thereof attached to the core and having means for normally engaging the supporting means to effect a compression load which is adapted to effect the aforesaid disengagement upon release of the load by disengagement of the compression load means from the supporting means, the compression load means including:

a pressure plate rotatably mounted on the end of the connector opposite the end thereof attached to the core and having, as the means for normally engaging the supporting means, peripheral bosses, extending radially of the rotation axis of the plate with the bosses being spaced in a pattern corresponding to that of the supporting means and normally engaged on the rollers thereof, compressible means adapted to be placed in compression by the plate when the bosses are engaged on the rollers and, upon disengagement of the bosses from the rollers, adapted to have the compression thereof released to exert a force on the plate and thence the core via the connector to concurrently overcome frictional force between the core and refractory material solidified therearound and move the plate away from the mold, and means for releasing the stored energy comprising means for disengaging the compression load means from the supporting means including:

means for rotating the plate, and indented peripheral portions in the plate between pairs of adjacent bosses and, upon rotation of the plate, adapted to coincide with the position of the supporting means with the bosses disengaged from the rollers and to allow the plate to pass between the supporting means in a direction away from the mold such that the compression of the compressible means is released.

2. The apparatus of claim 1 wherein the improvement further comprises the core also adapted to be disengaged from the walls of the aperture and at least partially removed from the mold cavity out through the aperture, and the energy means also adapted to effect the disengagement of the core from the walls of the aperture and at least partial removal of the core from the mold cavity.

3. The apparatus of claim 2 wherein the improvement further comprises the core being a rigid body having a taper in the direction of its extension into the mold cavity and further adapted to be slidably disengaged from the refractory material solidified therearound and from the walls of the aperture.

4. The apparatus of claim 3 wherein the compressible means is spring means.

5. The apparatus of claim 3 wherein the improvement further comprises the core extending into an aperture in the mold surface of the opposite side of the mold cavity from the first-mentioned aperture.

6. The apparatus of claim 3 wherein the mold surface or surfaces and the surface of the core are graphite.

* * * * *